Feb. 19, 1963 — O. T. McILVAINE — 3,077,774
HUMIDITY INDICATING DEVICE
Filed Feb. 18, 1957 — 2 Sheets-Sheet 1
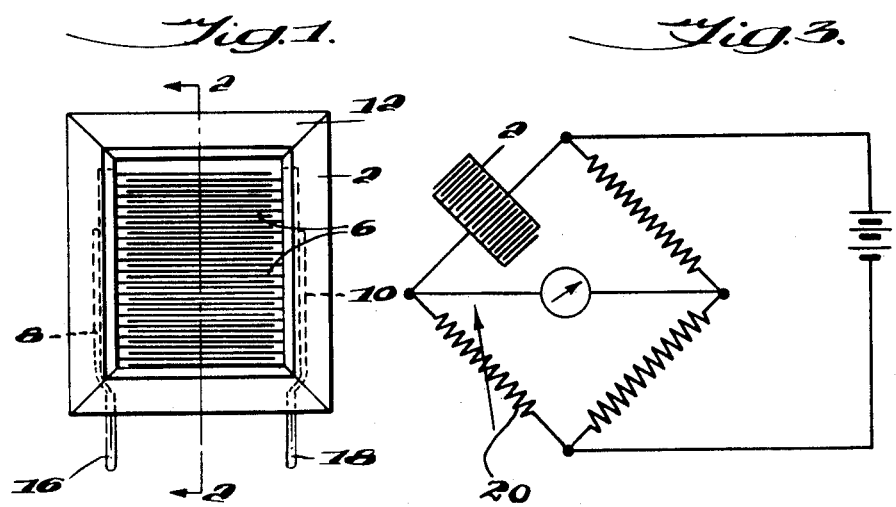
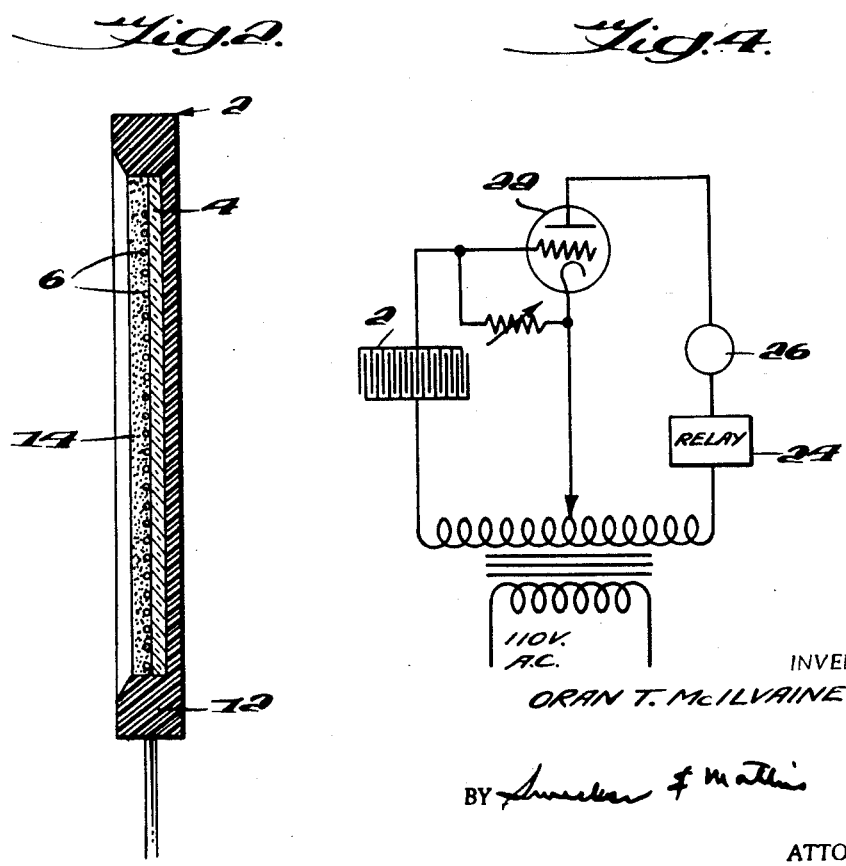
INVENTOR
ORAN T. McILVAINE,
ATTORNEYS Feb. 19, 1963          O. T. McILVAINE          3,077,774

HUMIDITY INDICATING DEVICE

Filed Feb. 18, 1957          2 Sheets-Sheet 2

INVENTOR
ORAN T. McILVAINE,

BY Sucker & Mathis

ATTORNEYS

United States Patent Office 3,077,774
Patented Feb. 19, 1963

3,077,774
HUMIDITY INDICATING DEVICE
Oran T. McIlvaine, St. Charles, Ill., assignor to Energy Kontrols, Inc., a corporation of Illinois
Filed Feb. 18, 1957, Ser. No. 640,957
8 Claims. (Cl. 73—336.5)

This invention relates to improvements in humidity indicating devices. More particularly, it relates to a device for operating a control unit in response to humidity.

Prior art devices include such things as hair hygrometers, wet and dry bulb thermometers, apparatus for determining the dew point by lowering the temperature, and assorted electrical units which depend upon variation in resistance.

Hair hygrometers are unsatisfactory for some types of service since they become inaccurate in a short time due to changes in the ability of the hair to expand and contract with use.

Wet and dry bulb thermometers are inconvenient to use since some types thereof must be whirled rapidly in the atmosphere, and they are inaccurate at very high and very low humidities.

Dew point apparatus is clumsy to use and not practical for many applications.

The prior resistance elements have been dependent upon absorption or adsorption of moisture and consequently have been rather slow acting. Also they have been structurally weak and have not been suitable for use where there are abrasive forces, chemical action, or exposure to extremes of temperature.

Accordingly, it is an object of this invention to provide a resistor element or electrical hygrometer which has a rapid rate of response to variations in humidity.

Another object is to provide a resistor element capable of withstanding extensive exposure to the elements and to abrasive wear without being damaged.

Another object is to provide an electrical hygrometer which is easy to make and capable of use in the accurate measurement of humidity.

Further objects of my invention will be made apparent from the detailed description and the claims which follow.

One embodiment of the present invention consists of an insulating base upon which are placed several lines of conducting material which are separated by narrow spaces. The conductivity of the spaces between the lines of conducting material varies with variations in the moisture content of the surrounding medium. This variation in resistance apparently is caused by the presence of water molecules in the atmosphere near the insulating plate which tend, due to their inherent charged state, to control the flow of charges in the surface of the insulator.

A preferred embodiment of the invention is set forth in the accompanying drawings, in which:

FIG. 1 is an elevation of one of the complete resistance elements;

FIG. 2 is an enlarged cross section taken along the line 2—2 in FIG. 1;

FIG. 3 is a bridge circuit embodying one of the elements;

FIG. 4 shows the use of a high resistance type element for the control of a tube;

Figure 5:
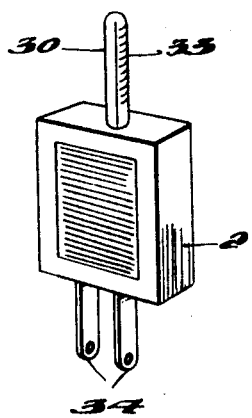
FIG. 5 is a perspective view illustrating the use of the resistance element in conjunction with a neon bulb.

Referring now more particularly to FIGS. 1 and 2, the numeral 2 is used to designate a complete resistance unit.

At 4 in the unit is a sheet of insulating material such as glass, quartz, ceramic material, plastic, or the like.

At 6 is shown a series of thin lines of conducting material, such as silver. A number of these conducting lines are connected like the teeth of two interleaving combs by connectors 8 and 10. The lines 6 on one side, connected to connector 8, are separated from those connected to connector 10 by the face of the insulating element 4 between them.

The sheet of insulating material 4 with the conducting lines 6 on its face and connectors 8 and 10 with terminals 16 and 18 may be embedded in plastic or other supporting material as indicated at 12 to form a complete unit 2.

The unit 2 constructed according to the preceding paragraph is sensitive to humidity in its environment. It may be used to indicate that humidity, when charged electrically, and connected in an appropriate circuit, such as one of those shown in FIGS. 3 and 4.

A unit such as has been described is not as permanent, nor does it cover as wide a range as has been found desirable and as is covered by the units which will be described next.

The element as described above may be modified by adding a coating of various insulating materials, as indicated at 14 in FIG. 2. This coating may consist of a layer of glass particles sintered over the lines and into the glass plate. Many other chemicals and materials can be used, however, such as thin films of plastic materials, waxes, and oils of various kinds. Silicones and greases may also be used. Some of these materials may be applied to the face of the insulator by wiping on with a rag. Other materials may be evaporated onto the insulator in a vacuum, e.g., MgF, carbon, $MnO_2$, etc.

The more permanent of these coatings, such as the sintered glass, produce very durable humidity elements. Those which are of less permanence, such as the silicones or oils, possess the advantage that layers of materials of varying thicknesses may be applied which will cause the same element to have different degrees of sensitivity. Generally, a thicker layer of film will slow the response of the element, while a thinner one will speed it up.

In the case of the more durable coatings, the response of the element can be made permanently fast or slow by use of a thin or a thick coating. An element may be made which will read a particular range of humidity with greater precision by changing the size of the particles in the coating.

In order to make an instrument which will read a low percentage of humidity accurately, the conducting lines are placed close together on the insulator, together with a thin layer of coating material.

The grid of conducting lines is etched or ruled onto the glass or other insulator in the form of two interleaving combs, as shown in FIG. 1. These are then fired on the glass at high temperature so that they are permanent.

Units constructed according to the foregoing result in elements which are alike in that the resistance of the elements decreases as the humidity increases. This is what would be expected, since the phenomenon involved herein appears to depend upon charges induced in the molecules of the substance when water molecules come near the face of the insulator and the conducting lines.

Another type of coating may be applied at 14 which displays a condition of maximum ionization when the humidity is at a minimum. Under these circumstances, the resistance increases with increasing humidity so that we have a resistance characteristic which is the reverse of that with the other coatings. This would be a negative resistance characteristic.

The coating which produces this negative resistance characteristic is finely divided carbon, lamp black, or the like, mixed with ethyl cellulose binder or other plastic material made up in a liquid form and painted on the grid. When the vehicle evaporates, it leaves a durable film of ethyl cellulose with the carbon suspended therethrough.

In addition to having the property of displaying low resistance when dry and high resistance when wet, this negative resistance element can be designed to present ranges of low resistance of the order of zero to five ohms, depending upon the proportion of carbon used. This element also presents a practically linear curve when resistance is plotted against humidity, whereas the high resistance coatings listed above, present a log scale or other such curve.

The explanation of the operation of this device would appear to rest on the modern theory of solid-state physics, since that appears to be the only theory which accounts for all that seems to take place in these elements.

Briefly, the theory is that the molecules of some solids are so arranged that electrical charges close to the molecules will cause electrons to flow, or at least control their flow. At the surface of two different materials, energy bands are set up by the charges in, at, or on the different surfaces. If a single material is involved, charges apparently are set up just below the surface.

Applying this explanation to FIG. 2, it appears that the presence of molecules of moisture (which generally are charged) in the atmosphere near the coating 14 will induce charges in the coating 14 and also in the plate 4 so that energy bands will be set up between the plate 4 and the coating 14. These bands will increase or decrease the conductivity between the parts of the grid, i.e., cause the elements to exhibit positive or negative resistance characteristics, depending on the kinds of material involved. Most materials exhibit a positive resistance, with a rise in conductivity corresponding to increases in humidity. Some substances, such as finely divided carbon or lamp black, display negative resistance characteristics with a decrease in conductivity accompanying an increase in humidity.

One bit of experimental evidence which appears to support this hypothesis is that the units exhibit polarization. If voltage is left on the grid for a period of time and the polarity is then reversed, the element will give a large reverse reading similar to a battery, showing that charges have been set up in the material.

It should also be noted that the behavior of these units is similar to that of transistors with their N type and P type material. The charges in the water molecules in the air appear to control the flow of electrons in these units much as does the charge on the grid of an electron tube or the charge on the emitter of a transistor.

The circuit shown in FIG. 3 is a more or less conventional bridge circuit which may have its variable resistor 20 calibrated to read humidity directly. FIG. 3 can obviously be adapted to operate on A.C. as well as from the D.C. battery shown. Unit 2 preferably may be a low resistance type.

The units may be adapted to operate any type of electrical control or recording device. An example is shown in FIG. 4 in which a unit 2 provides the control signal for a triode 22 which in turn can operate relays such as 24, meters such as 26, etc. In this case the unit 2 may be a high resistance type.

Figure 8:
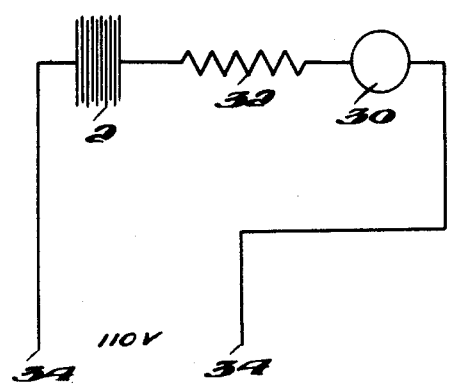
FIG. 8 is a schematic diagram of the circuits in FIGS. 5 and 7.

The device illustrated in FIG. 5 is a simple unit which utilizes the moisture sensitive unit 2 with a space discharge lamp, such as neon bulb 30, to secure a reading of relative humidity. The neon bulb 30 is in series with the unit 2, as shown in FIG. 8, a resistor 32 and 110 volt A.C. terminals 34.

Figure 6:
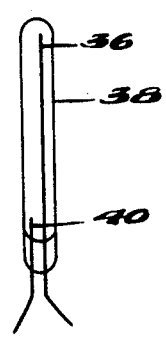
FIG. 6 is a similar view showing a neon glow bulb having a long wire and a short wire calibrated to read in humidity.

The neon bulb 30, as shown in FIGS. 5 and 6, has one long wire 36 inside the transparent envelope 38, and one short wire 40. The envelope 38 is filled with a suitable gas, such as neon gas, which glows when current passes through it. The more current which passes through the gas, the more it glows, the glow commencing first at the base of the lamp and gradually extending upward along the long wire as the amount of current flow increases.

It is possible to calibrate the neon bulb by placing a scale, indicated at 33, on its surface, graduated as percent humidity. When the glow extends to a particular scale marker, the relative humidity will then be known.

Figure 7:
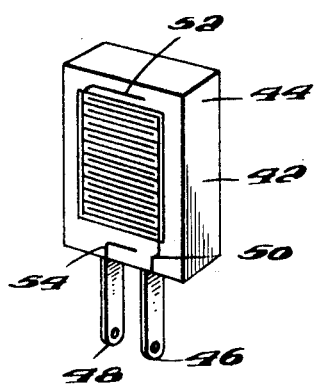
FIG. 7 is a perspective view of a construction similar to FIG. 1 but which includes a neon glow bulb within the plastic walls.

The construction shown in FIG. 7 incorporates a glass or plastic bulb 42 filled with neon, or other suitable gas, and placed in a unit 44 which resembles the unit 2. In this construction, a terminal 46 connects to one side of a 110-volt line, and a terminal 48 to the other side. Terminal 46 connects through a wire 50 to one set of the conductors 6 (FIG. 1) and through the resistance unit to the other set of conductors 6, and then to the wire 52 which is placed in the neon bulb (see FIG. 8). The terminal 48 connects to a second wire 54 which is also in the neon bulb.

With the terminals 46 and 48 plugged into a 110-volt source, the neon bulb will light up and change in brightness with variations in humidity, the higher the humidity, the brighter the bulb becomes.

Figure 9:
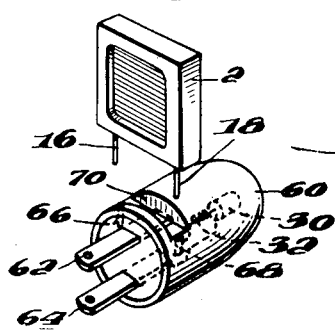
FIG. 9 is a disassembled perspective in which the humidity element is shown mounted on the shell around the neon bulb.

The schematic diagram shown in FIG. 8 is common to FIGS. 5, 7 and 9. It shows the connection of the neon lamp, the resistance, and the moisture responsive unit in series across a 110-volt line.

FIG. 9 illustrates a modification in which a neon glow bulb 30 and a resistance 32 are encased in a glass or plastic envelope 60 (shown transparent for clarity) in series with each other and connecting to the external plug 62 and socket 63 together. In this view, terminals 16 and 18 of unit 2 (FIG. 1) are disengaged from sockets 66 and 68 which are embedded in the plastic and connect to terminal 64 and resistor 32 respectively.

When the unit 2 engages sockets 66 and 68 through its terminals 16 and 18, respectively, a series connection is completed from terminal 62 through socket 66 to terminal 16, from terminal 16 through unit 2 to terminal 18, from terminal 18 through socket 68 to resistor 32, and from resistor 32 through neon bulb 30 to terminal 64. The embodiment shown in FIG. 9 might preferably be modified to place the resistor 32 between the socket 66 and the plug 62, since assembly may be somewhat simpler. The connections shown in FIG. 9 were chosen for clarity in the illustration.

The unit 2 is seated in a recess 70 in the envelope 60, forming a receptacle for the unit 2, embracing the latter, and holding it in place. The sockets 66 and 68 are in the bottom of this receptacle 70, to form an effective holder for the unit 2.

When the terminals 62 and 64 are connected across an appropriate power supply (preferably 110-v. A.C.), the neon bulb 30 will glow brightly when the humidity is high and dimly when it is low. Calibration may be provided thereon to indicate variation in humidity.

Although I have shown and described particular embodiments of my invention, it is apparent that many variations thereof are possible. My invention, therefore, is not to be restricted except insofar as is necessitated by the prior art and by the appended claims.

I claim:

1. A humidity sensitive indicating device comprising an envelope, a neon bulb, a resistor, a moisture responsive element, said element being capable of transmitting an induced electron flow responsive to moisture on the surface of the material, a pair of plugs attached to the moisture responsive element, a pair of sockets in the envelope receiving the pair of plugs, a pair of plugs attached to the envelope engageable with a power supply, and means connecting the pair of plugs attached to the envelope in series with the resistor, the neon bulb, the sockets attached to the envelope and the moisture responsive element when the plugs on the latter are engaged with the sockets.

2. A humidity indicating device comprising an electrically conductive grid, a coating on the grid impermeable to moisture, said coating including a material having an electric resistance which changes with changes of moisture on the surface thereof, an electron measuring means, and means connecting the grid with the electron measuring means whereby the electron measuring means will indicate relative humidity.

3. A humidity indicating device comprising an electrically conductive grid, a coating on the grid impermeable to moisture, said coating including a material having an electric resistance which changes with changes of moisture on the surface thereof, an electron measuring means and means connecting the grid with the electron measuring means whereby moisture adjacent the coating will induce electrical charges on the grid and the electron measuring means will indicate relative humidity.

4. A humidity indicating device comprising a positive grid and a negative grid, said grids being electrically conductive and spaced apart from each other and having a coating impermeable to moisture and including a material having an electric resistance which changes with changes of moisture on the surface thereof, said coating enclosing both grids therein, an electron measuring means and means connecting the grids with the electron measuring means, whereby moisture adjacent the coating will induce electrical charges in the space between the grids and whereby the electron measuring means will indicate relative humidity.

5. A humidity measuring device comprising an electrically conductive grid having spaced conductor leads, a coating on the grid between the leads thereof of a material impermeable to moisture, said coating material having an electric resistance which changes with changes of moisture on the surface thereof, electric measuring means, and means for connecting the leads of the grid with the measuring means for measuring relative humidity thereby.

6. A humidity measuring device comprising a sheet of insulating material, an electrically conductive grid formed on the surface of said sheet with spaced conductor leads, a coating over the grid and between the leads thereof, said coating comprising a material impermeable to moisture and having an electric resistance which changes with changes of moisture on the surface thereof, electric measuring means and means for connecting the respective leads of the grid with the measuring means for measuring relative humidity thereby.

7. A humidity measuring device comprising a sheet of insulating material, an electrically conductive grid formed on the surface of said sheet with spaced conductor leads, a coating over the grid and between the leads thereof, said coating comprising a material impermeable to moisture and having an electric resistance which changes with changes of moisture on the surface thereof, electric measuring means, and means for connecting the respective leads of the grid with the measuring means for measuring relative humidity thereby, a body of supporting material having the sheet and coating carried thereby, terminals connected with the grid conductor leads, said terminals being carried by the body and extending outwardly therefrom.

8. A humidity sensing indicating device comprising an envelope having means for mounting a light source and a resistor therein, a pair of plugs connected with the envelope adapted to be connected with a power supply, a moisture responsive element capable of transmitting an induced electric flow responsive to moisture on the surface thereof and a pair of plugs attached to the moisture responsive element, a pair of sockets attached to the envelope receiving the last-mentioned pair of plugs, and means connecting the first-mentioned pair of plugs and the resistor and light source mounting means in an electric circuit with the moisture responsive element when the plugs on the latter are engaged with the sockets.

References Cited in the file of this patent

UNITED STATES PATENTS

| | | |
|---|---|---|
| 1,749,826 | Lubach | Mar. 11, 1930 |
| 1,753,330 | Bragg | Apr. 8, 1930 |
| 2,064,641 | Fiene | Dec. 15, 1936 |
| 2,234,858 | Brown et al. | Mar. 11, 1941 |
| 2,381,299 | McCulloch | Aug. 7, 1945 |
| 2,689,479 | Feigal | Sept. 21, 1954 |
| 2,701,832 | Marsden et al. | Feb. 8, 1955 |
| 2,711,511 | Pietenpol | June 21, 1955 |
| 2,714,149 | Craig | July 26, 1955 |
| 2,715,667 | Auwarter | Aug. 16, 1955 |
| 2,904,765 | Seehof et al. | Sept. 15, 1959 |
| 2,937,524 | Gregor | May 24, 1960 |